United States Patent
Park et al.

(10) Patent No.: US 11,824,452 B2
(45) Date of Patent: Nov. 21, 2023

(54) INTEGRATED POWER CONVERSION APPARATUS FOR XEV AND INTEGRATED POWER CONVERSION METHOD THEREOF

(71) Applicant: UIF (University Industry Foundation), Yonsei University, Seoul (KR)

(72) Inventors: Jung Wook Park, Seoul (KR); Issac Kim, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 17/662,621

(22) Filed: May 9, 2022

(65) Prior Publication Data

US 2022/0360178 A1    Nov. 10, 2022

(30) Foreign Application Priority Data

May 10, 2021    (KR) ......................... 10-2021-0060063

(51) Int. Cl.
| | |
|---|---|
| *B60L 53/20* | (2019.01) |
| *H02M 3/335* | (2006.01) |
| *H02M 5/458* | (2006.01) |
| *H02P 27/06* | (2006.01) |

(52) U.S. Cl.
CPC ............ *H02M 3/335* (2013.01); *B60L 53/20* (2019.02); *H02M 5/4585* (2013.01); *H02P 27/06* (2013.01)

(58) Field of Classification Search
CPC .. H02M 3/335; H02M 5/4585; H02M 1/0095; H02M 1/007; H02M 1/4233; H02M 3/33584; H02M 7/5387; H02M 7/797; H02M 3/33573; B60L 53/20; B60L 2210/12; B60L 2210/14; B60L 53/24; B60L 58/20; H02P 27/06; H02P 2201/07
USPC ........................................................ 307/9.1
See application file for complete search history.

(56) References Cited

U.S. PATENT DOCUMENTS

| | | | |
|---|---|---|---|
| 10,562,404 B1* | 2/2020 | Khaligh | .................. H02M 1/12 |
| 2016/0120741 A1 | 5/2016 | Spicer et al. | |
| 2021/0155100 A1* | 5/2021 | Khaligh | .............. H02M 1/4208 |

FOREIGN PATENT DOCUMENTS

| | | |
|---|---|---|
| KR | 10-1295317 B1 | 8/2013 |
| KR | 10-2017-0131895 A | 12/2017 |

* cited by examiner

*Primary Examiner* — Rexford N Barnie
*Assistant Examiner* — Xuan Ly
(74) *Attorney, Agent, or Firm* — BROADVIEW IP LAW, PC

(57) ABSTRACT

According to the integrated power conversion apparatus and method according to the exemplary embodiment of the present disclosure, the on-board battery charger (OBC), the lower voltage battery charger (LDC), and the traction converter (TC) are integrated to convert the power so that all the functions which need to be performed by the power conversion system of the related art can be performed. Further, the number of switches is reduced to increase a power density and not only the number of switches, but also the number of controllers is reduced to improve feasibility.

11 Claims, 13 Drawing Sheets

INTEGRATED POWER CONVERSION APPARATUS FOR XEV AND INTEGRATED POWER CONVERSION METHOD THEREOF

CROSS-REFERENCE TO RELATED APPLICATIONS

This application is based on and claims priority under 35 U.S.C. 119 to Korean Patent Application No. 10-2021-0060063 filed in the Korean Intellectual Property Office on May 10, 2021, the entire contents of which are herein incorporated by reference in its entirety.

BACKGROUND

Field

The present disclosure relates to an integrated power conversion apparatus for an electric vehicle and a method thereof, and more particularly, to an apparatus and a method for converting a power of an electric vehicle (xEV

Description of the Related Art

FIG. 1 is a view for explaining a structure of a detachable power conversion system of the related art and FIG. 2 is a view for explaining a topology of a detachable power conversion system of the related art illustrated in FIG. 1.

Referring to FIG. 1, an on-board charger (OBC) of a detachable power conversion system of the related art operates by converting an output voltage using a DC/DC converter to be appropriate for a high voltage battery after increasing a power factor of a power from the grid using a power factor compensation circuit (PFC converter). A low voltage DC/DC converter (LDC) of the detachable power conversion system of the related art operates while dropping the voltage of the high voltage battery to a low voltage of a low voltage battery through a DC/DC converter. A traction converter (TC) of the detachable power conversion system of the related art raises a voltage of the high voltage battery using a high voltage DC/DC converter (HDC) and adjusts an input voltage of an inverter and the traction converter (TC) drives a motor using the voltage.

That is, a detachable power conversion system embedded in an electric vehicle xEV charges a high voltage battery using the on-board battery charger (OBC) and charges an auxiliary battery through a low voltage battery charger (LDC) using the high voltage battery. Further, the motor is driven by means of a traction converter (TC) with a high voltage battery as an input. That is, two power conversion apparatuses configure a battery charging system and the traction converter TC serves to drive a motor. According to this method, there are problems in that a number of switches and devices is increased to increase a volume of the charging system and the traction converter TC and increase a cost.

That is, as illustrated in FIG. 2, in the case of the detachable power conversion system of the related art, a number of used devices is large and a converter for one load is individually provided so that an entire volume of the system is increased. Therefore, there is a limitation in increasing a necessary power capacity. Further, the number of necessary devices is large and a controller therefor is necessary so that there is a problem in that a cost required to configure the system is high.

FIG. 3 is a view for explaining a topology of a power conversion system to which an OBC/LDC integrated circuit of the related art is applied and FIG. 4 is a view for explaining a topology of a power conversion system to which an OBC/TC integrated circuit of the related art is applied.

Currently, in order to improve the above-mentioned problems, studies for a method of charging two batteries with one circuit by integrating charging systems which charge a high voltage battery and a low voltage battery, that is, as illustrated in FIG. 3, integrating an on-board battery charger (OBC) and a low voltage battery charger (LDC) are being conducted.

Further, as illustrated in FIG. 4, a study for a method for integrating the on-board battery charger (OBC) and the traction converter (TC) by integrating the DC/DC converter of the on-board battery charger and a DC/DC converter of the traction converter (TC) and integrating a PFC converter and a traction inverter TC of the on-board battery charger OBC is being conducted.

That is, in the related art, a study for an integration method which operates for one load in each mode is being conducted.

However, an integration method which provides the smallest volume and the lowest cost while performing all the operations of the related art, that is, a method for an integrated power conversion system which concurrently operates for two loads and integrates all of three power conversion apparatuses including the on-board battery charger (OBC), the lower voltage battery charger (LDC), and the traction converter (TC) has not been studied.

SUMMARY

An object to be achieved by the present disclosure is to provide an integrated power conversion apparatus and method for an electric vehicle in which an on-board charger (OBC) for an electric vehicle (xEV), a low voltage DC/DC converter (LDC), and a traction converter (TC) are integrated to convert a power.

Other and further objects of the present invention which are not specifically described can be further considered within the scope easily deduced from the following detailed description and the effect.

In order to achieve the above-described objects, according to an aspect of the present disclosure, an integrated power conversion apparatus for an electric vehicle includes a first converter unit which is selectively connected to one of a driving unit including a motor and an external device; a second converter unit whose one end is connected to the first converter unit through one end and the other end is connected to a power storage unit including a high voltage battery and a low voltage battery; and a power conversion control unit which controls the first converter unit and the second converter unit to operate in one of a first power conversion mode in which the high voltage battery is charged with a power supplied from the external device, a second power conversion mode in which the power charged in the high voltage battery is supplied to the external device, a third power conversion mode in which the power charged in the high voltage battery is supplied to the motor and the low voltage battery is charged with the power charged in the high voltage battery, a fourth power conversion mode in which the high voltage battery and the low voltage battery are charged with the power supplied from the external device, and a fifth power conversion mode in which the lower voltage battery is charged with the power supplied from the external device.

Here, the second converter unit includes: a first circuit which is connected to the high voltage battery through one end and includes a H-bridge converter; a second circuit which is connected to the first converter unit through one end and includes a H-bridge converter; and a third circuit which is connected to the low voltage battery through one end and includes a step-down converter, and the first converter unit includes a fourth circuit which is connected to the second circuit through one end and is connected to one of the motor and the external device through the other end and includes a 3-leg converter.

Here, the first circuit includes a H-bridge converter including a first switching element, a second switching element, a third switching element, and a fourth switching element, the second circuit includes a H-bridge converter including a fifth switching element, a sixth switching element, a seventh switching element, and an eighth switching element, the third circuit includes a step-down converter including a ninth switching element and a tenth switching element, and the fourth circuit including a 3-leg converter including an eleventh switching element, a twelfth switching element, a thirteenth switching element, a fourteenth switching element, a fifteenth switching element, and a sixteenth switching element.

Here, when the power conversion control unit operates in the first power conversion mode, the power conversion control unit controls the first converter unit to be connected to the external device, turns on the thirteenth switching element and the fourteenth switching element of the fourth circuit to be turned off to control the 3-leg converter of the fourth circuit to operate as a totem pole PFC converter configured by the eleventh switching element, the twelfth switching element, the fifteenth switching element, and the sixteenth switching element, turns off the ninth switching element of the third circuit to control the step-down converter of the third circuit to be separated from the power conversion system and controls the H-bridge converter of the second circuit to operate by phase shift control, and controls the H-bridge converter of the first circuit to operate as a synchronous rectifier to charge the high voltage battery with a power supplied from the external device based on a turn ratio of a second winding of the second circuit to a first winding of the first circuit.

Here, when the power conversion control unit operates in the second power conversion mode, the power conversion control unit controls the first converter unit to be connected to the external device, controls the H-bridge converter of the first circuit to operate by phase shift control, and controls the H-bridge converter of the second circuit to operate as a synchronous rectifier, turns off the thirteenth switching element and the fourteenth switching element of the fourth circuit to control the 3-leg converter of the fourth circuit to operate as a single phase inverter configured by the eleventh switching element, the twelfth switching element, the fifteenth switching element, and the sixteenth switching element, turns off the ninth switching element of the third circuit to control the step-down converter of the third circuit to be separated from the power conversion system and controls the H-bridge converter of the second circuit to operate by phase shift control to charge the high voltage battery with a power supplied from the external device based on a turn ratio of a first winding of the first circuit to a second winding of the second circuit.

Here, when the power conversion control unit operates in the third power conversion mode, the power conversion control unit controls the first converter unit to be connected to the motor, controls the H-bridge converter of the first circuit to operate by phase shift control to maintain a DC-link voltage required to drive the motor, controls the 3-leg converter of the fourth circuit to operate as a three-phase inverter to drive the motor based on the DC-link voltage to control a PSFB converter configured by the first circuit and the second circuit to adjust a DC-link voltage which is an input voltage of the three-phase inverter and raise the voltage of the high voltage battery based on the phase shift control and the turn ratio of the first winding of the first circuit to the winding of the second circuit to supply the power charged in the high voltage battery to the motor and controls the step-down converter of the third circuit to adjust a duty and perform a power delivery operation and a freewheeling operation in the period in which the first switching element and the fourth switching element of the first circuit are turned on and to perform a freewheeling operation in the other period, to adjust a voltage applied to the first circuit with the turn ratio of the first winding of the first circuit to a third winding of the third circuit to charge the low voltage battery with the power charged in the high voltage battery.

Here, when the power conversion control unit operates in the fourth power conversion mode, the power conversion control unit controls the first converter unit to be connected to the external device, turns off the thirteenth switching element and the fourteenth switching element of the fourth circuit to control the 3-leg converter of the fourth circuit to operate as a totem pole PFC converter configured by the eleventh switching element, the twelfth switching element, the fifteenth switching element, and the sixteenth switching element, controls the H-bridge converter of the second circuit to operate by phase shift control, and controls the H-bridge converter of the first circuit to operate as a synchronous rectifier to charge the high voltage battery with a power supplied from the external device based on a turn ratio of a second winding of the second circuit to a first winding of the first circuit and controls the step-down converter of the third circuit to adjust a duty and perform a power delivery operation and a freewheeling operation in the period in which the fifth switching element and the eighth switching element of the second circuit are turned on and to perform a freewheeling operation in the other period, to adjust a voltage applied to the second circuit with the turn ratio of the second winding of the second circuit to a third winding of the third circuit to charge the low voltage battery with the power supplied from the external.

Here, when the power conversion control unit operates in the fifth power conversion mode, the power conversion control unit controls the first converter unit to be connected to the external device, turns off the thirteenth switching element and the fourteenth switching element of the fourth circuit to control the 3-leg converter of the fourth circuit to operate as a totem pole PFC converter configured by the eleventh switching element, the twelfth switching element, the fifteenth switching element, and the sixteenth switching element, controls the H-bridge converter of the second circuit to operate by phase shift control having a fixed duty, and controls the step-down converter of the third circuit to adjust the duty in the period in which the fifth switching element and the eighth switching element of the second circuit are turned on and to perform a freewheeling operation in the other period, to adjust a voltage applied to the second circuit with the turn ratio of the second winding of the second circuit to the third winding of the third circuit to charge the low voltage battery with the power supplied from the external device.

Here, the power conversion control unit includes: a first switching module having one end which is selectively connected to the external device and the motor and the other end which is connected to the first converter unit; a second switching module having one end which is connected to the motor and the other end which is connected to the first converter unit; and a third switching module having one end which is selectively connected to the external device and the motor and the other end which is connected to the first converter unit; according to one power conversion mode, the power conversion control unit controls the second switching module to be open and the first switching module and the third switching module to be connected to the external device to connect the first converter unit to the external device or controls the second switching module to be connected to the second switching module and controls the first switching module and the third switching module to be connected to the motor to connect the first converter unit to the motor.

In order to achieve the above-described objects, according to an aspect of the present disclosure, an integrated power conversion method for an electric vehicle is an integrated power conversion method of an integrated power conversion apparatus which includes a first converter unit which is selectively connected to one of a driving unit including a motor and an external device; a second converter unit whose one end is connected to the first converter unit through one end and the other end is connected to a power storage unit including a high voltage battery and a low voltage battery; and a power conversion control unit which controls the first converter unit and the second converter unit, including: allowing the power conversion control unit to connect the first converter mode to one of the motor and the external device according to one power conversion mode among a first power conversion mode, a second power conversion mode, a third power conversion mode, a fourth power conversion mode, and a fifth power conversion mode; and allowing the power conversion control unit to control operations of the first converter unit and the second converter unit according to the one power conversion mode, the first power conversion mode is a mode in which the high voltage battery is charged with a power supplied from the external device, the second power conversion mode is a mode in which the power charged in the high voltage battery is supplied to the external device, the third power conversion mode is a mode in which the power charged in the high voltage battery is supplied to the motor and the low voltage battery is charged with the power charged in the high voltage battery, the fourth power conversion mode is a mode in which the high voltage battery and the low voltage battery are charged with the power supplied from the external device, and the fifth power conversion mode is a mode in which the lower voltage battery is charged with the power supplied from the external device.

Here, the second converter unit includes: a first circuit which is connected to the high voltage battery through one end and includes a H-bridge converter; a second circuit which is connected to the first converter unit through one end and includes a H-bridge converter; and a third circuit which is connected to the low voltage battery through one end and includes a step-down converter, and the first converter unit includes a fourth circuit which is connected to the second circuit through one end and is connected to one of the motor and the external device through the other end and includes a 3-leg converter.

Here, the first circuit includes a H-bridge converter including a first switching element, a second switching element, a third switching element, and a fourth switching element, the second circuit includes a H-bridge converter including a fifth switching element, a sixth switching element, a seventh switching element, and an eighth switching element, the third circuit includes a step-down converter including a ninth switching element and a tenth switching element, the fourth circuit including a 3-leg converter including an eleventh switching element, a twelfth switching element, a thirteenth switching element, a fourteenth switching element, a fifteenth switching element, and a sixteenth switching element.

Here, the power conversion control unit includes: a first switching module having one end which is selectively connected to the external device and the motor and the other end which is connected to the first converter unit; a second switching module having one end which is connected to the motor and the other end which is connected to the first converter unit; and a third switching module having one end which is selectively connected to the external device and the motor and the other end which is connected to the first converter unit; in the first converter unit connecting step, according to one power conversion mode, the power conversion control unit controls the second switching module to be open and the first switching module and the third switching module to be connected to the external device to connect the first converter unit to the external device or controls the second switching module to be connected to the second switching module and controls the first switching module and the third switching module to be connected to the motor to connect the first converter unit to the motor.

According to the integrated power conversion apparatus and method according to the exemplary embodiment of the present disclosure, the on-board battery charger (OBC), the lower voltage battery charger (LDC), and the traction converter (TC) are integrated to convert the power so that all the functions which need to be performed by the power conversion system of the related art can be performed. Further, the number of switches is reduced to increase a power density and not only the number of switches, but also the number of controllers is reduced to improve feasibility.

The effects of the present invention are not limited to the technical effects mentioned above, and other effects which are not mentioned can be clearly understood by those skilled in the art from the following description

DETAILED DESCRIPTION OF THE EMBODIMENT

Figure 1:
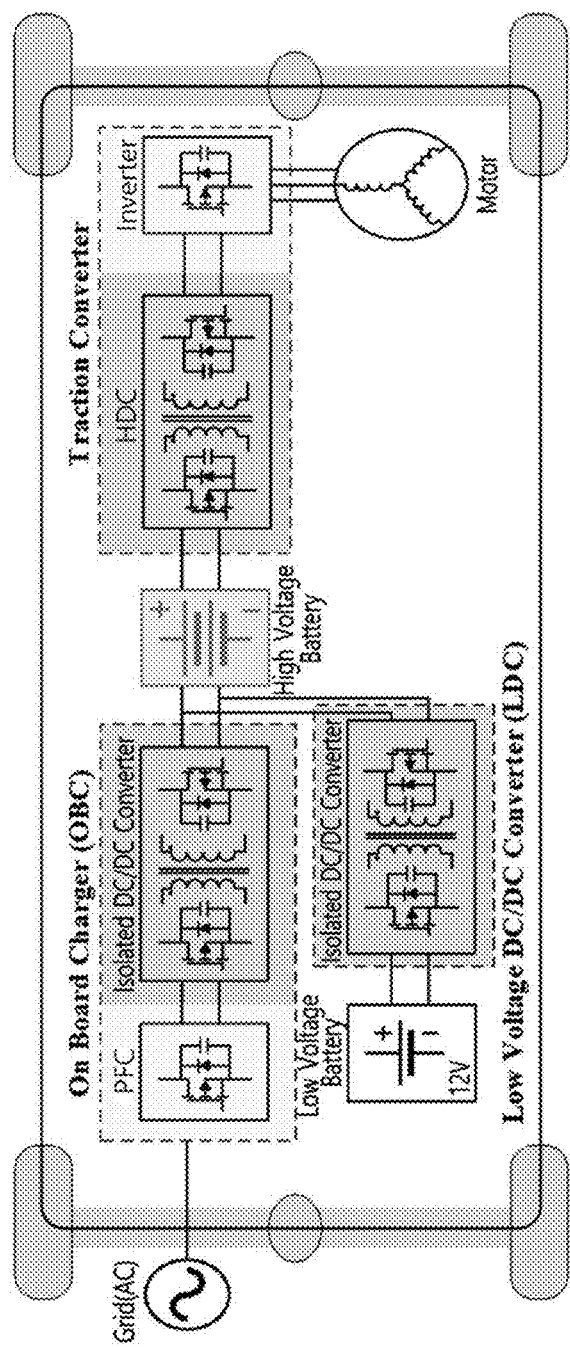
FIG. 1 is a view for explaining a structure of a detachable power conversion system of the related art.

Hereinafter, embodiments of the present disclosure will be described in detail with reference to the accompanying drawings. Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data structures, and variables. A function which is provided in the components and "~units" may be combined with a smaller number of components and "~units" or further divided into additional components and "~units".

Hereinafter, an exemplary embodiment of an integrated power conversion apparatus for an electric vehicle and an integrated power conversion method thereof according to the present disclosure will be described in detail with reference to the accompanying drawings.

First, an integrated power conversion apparatus for an electric vehicle according to an exemplary embodiment of the present disclosure will be described with reference to FIGS. 5 to 7.

Figure 5:
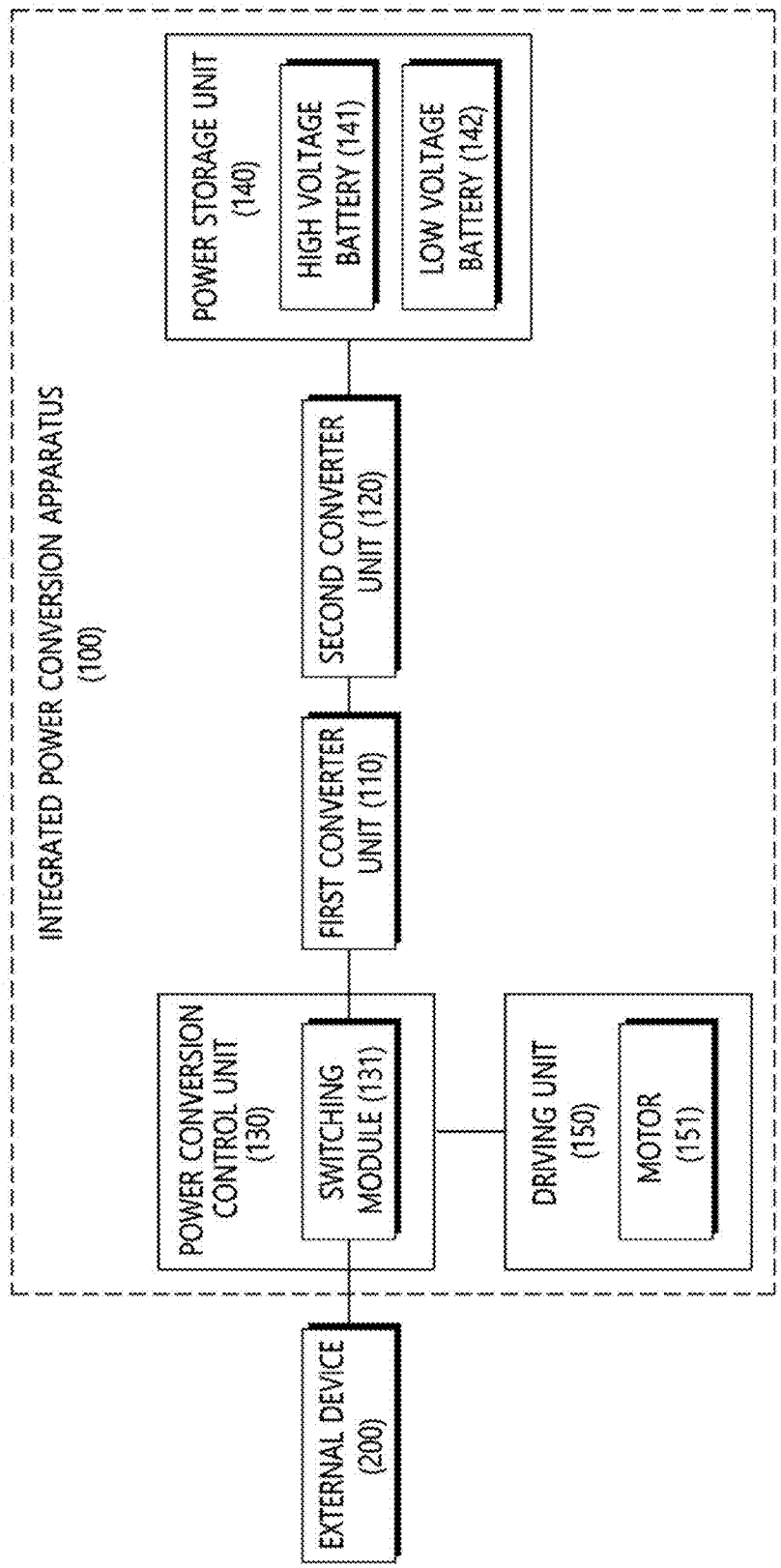
FIG. 5 is a block diagram for explaining an integrated power conversion apparatus for an electric vehicle according to an exemplary embodiment of the present disclosure.

FIG. 5 is a block diagram for explaining an integrated power conversion apparatus for an electric vehicle according to an exemplary embodiment of the present disclosure; FIG. 6 is a view for explaining an example of an integrated power conversion apparatus illustrated in FIG. 5; and FIG. 7 is a view for explaining a topology of an integrated power conversion apparatus illustrated in FIG. 5.

Figure 6:
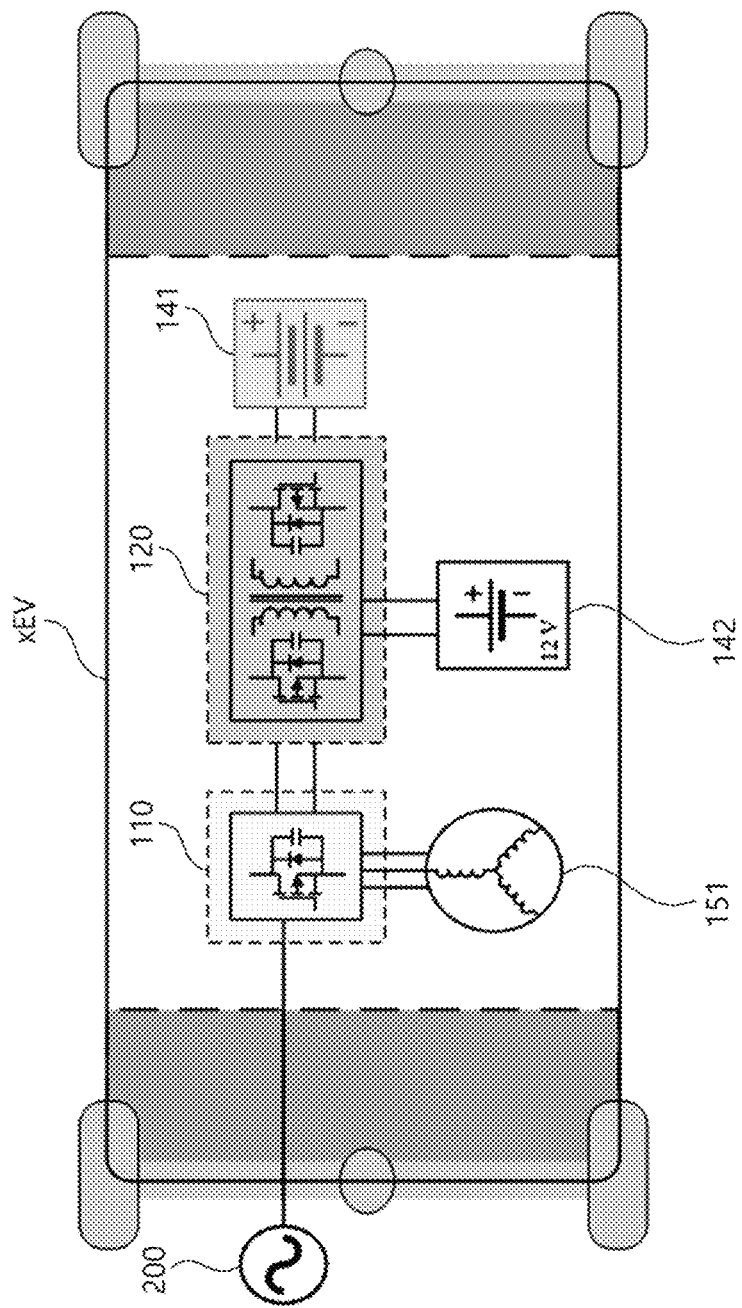
FIG. 6 is a view for explaining an implementation example of an integrated power conversion apparatus illustrated in FIG. 5.

Referring to FIGS. 5 and 6, an integrated power conversion apparatus for an electric vehicle according to an exemplary embodiment of the present disclosure (hereinafter, simply referred to as integrated power conversion apparatus) 100 integrates an on-board charger (OBC) for an electric vehicle xEV, a low voltage DC/DC converter (LDC), and a traction converter (TC) to convert the power.

Here, the integrated power conversion apparatus 100 according to the present disclosure performs all five following functions.

G2V (grid to vehicle) function: Function of charging a high voltage battery 141 with a power supplied from an external device 200

V2G (vehicle to grid) function of supplying power to system: Function of supplying power charged in a high voltage battery 141 to the external device 200

LDC/TC function of charging the low voltage battery 142 during the driving: Function of supplying the power charged in the high voltage battery 141 to the motor 151 and charging the low voltage battery 142 with the power charged in the high voltage battery 141

Hybrid charging function: Function of charging the high voltage battery 141 and the low voltage battery 142 with a power supplied from the external device 200

Low voltage battery charging function: Function of charging the low voltage battery 142 with a power supplied from the external device 200

To this end, the integrated power conversion apparatus 100 includes a first converter unit 110, a second converter unit 120, a power conversion control unit 130, a power storage unit 140 including a high voltage battery 141 and a low voltage battery 142, and a driving unit 150 including a motor 151 and may be connected to the external device 200.

One end of the second converter unit 120 is connected to the first converter unit 110 and the other end is connected to the power storage unit 140.

Figure 7:
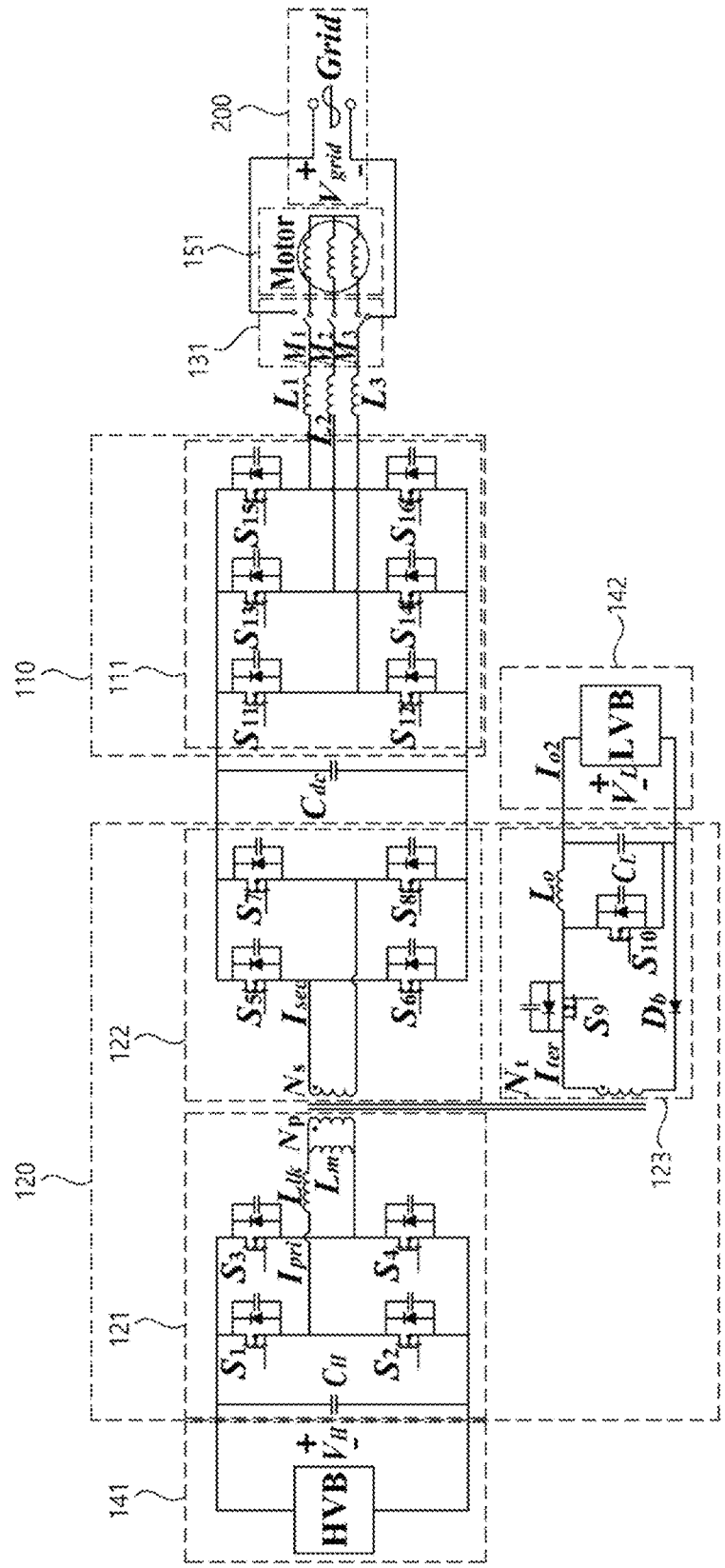
FIG. 7 is a view for explaining a topology of an integrated power conversion apparatus illustrated in FIG. 5.

That is, the second converter unit 120 may include a first circuit 121, a second circuit 122, and a third circuit 123, as illustrated in FIG. 7.

One end of the first circuit 121 is connected to the high voltage battery 141 and the first circuit includes a H-bridge converter. Here, the H-bridge converter of the first circuit 121 includes a first switching element $S_1$, a second switching element $S_2$, a third switching element $S_3$, and a fourth switching element $S_4$.

One end of the second circuit 122 is connected to the first circuit 110 and the second circuit 122 includes a H-bridge converter. Here, the H-bridge converter of the second circuit 122 includes a fifth switching element $S_5$, a sixth switching element $S_6$, a seventh switching element $S_7$, and an eighth switching element $S_8$.

One end of the third circuit 123 is connected to the low voltage battery 142 and the third circuit includes a step-down converter. Here, the step-down converter of the third circuit 123 may include a ninth switching element $S_9$ and a tenth switching element $S_{10}$.

The first converter unit 110 may be selectively connected to one of the driving unit 150 and the external device 200.

That is, the first converter unit 110, as illustrated in FIG. 7, includes a fourth circuit 111.

One end of the fourth circuit 111 is connected to the second circuit of the second converter unit 120 and the other end is connected to one of the motor 151 and the external device 200 and the fourth circuit includes a 3-leg converter. Here, the 3-leg converter of the fourth circuit 111 includes an eleventh switching element $S_{11}$, a twelfth switching element $S_{12}$, a thirteenth switching element $S_{13}$, a fourteenth switching element $S_{14}$, a fifteenth switching element $S_{15}$, and a sixteenth switching element $S_{16}$.

The power conversion control unit 130 may control the first converter unit 110 and the second converter unit 120 so as to operate in any one power conversion mode among a first power conversion mode, a second power conversion mode, a third power conversion mode, a fourth power conversion mode, and a fifth power conversion mode.

Here, the first power conversion mode is a power conversion mode in which the high voltage battery 141 is charged with a power supplied from the external device 200.

The second power conversion mode is a power conversion mode in which the power charged in the high voltage battery 141 is supplied to the external device 200.

The third power conversion mode is a power conversion mode in which the power charged in the high voltage battery 141 is supplied to the motor 151 and the low voltage battery 142 is charged with the power charged in the high voltage battery 141.

The fourth power conversion mode is a power conversion mode in which the high voltage battery 141 and the low voltage battery 142 are charged with a power supplied from the external device 200.

The fifth power conversion mode is a power conversion mode in which the low voltage battery 142 is charged with a power supplied from the external device 200.

That is, the power conversion control unit 130, as illustrated in FIG. 7, includes a switching module 131 including a first switching module $M_1$, a second switching module $M_2$, and a third switching module $M_3$.

One end of the first switching module $M_1$ is selectively connected to one of the external device 200 and the motor 151 and the other end is connected to the first converter unit 110.

One end of the second switching module $M_2$ is connected to the motor 151 and the other end is connected to the first converter unit 110.

One end of the third switching module $M_3$ is selectively connected to one of the external device 200 and the motor 151 and the other end is connected to the first converter unit 110.

According to one power conversion mode, the power conversion control unit 130 makes the second switching module $M_2$ open and connects the first switching module $M_1$ and the third switching module $M_3$ to the external device 200 to control the first converter unit 110 to be connected to the external device 200 or connects the second switching module $M_2$ to the motor 151 and connects the first switching module $M_1$ and the third switching module $M_3$ to the motor 151 to control the first converter unit 110 to be connected to the motor 151.

The external device 200 may be a supply source which supplies a power to the power conversion device 100 mounted in the electric vehicle xEV.

Further, the external device 200 may be a device which is supplied with the power stored in the power storage unit 140 of the integrated power conversion apparatus 100 mounted in the electric vehicle xEV to perform a predetermined function. In this case, the integrated power conversion apparatus 100 may serve as a supply source which supplies a power to the external device 200.

Now, an operation according to a power conversion mode according to an exemplary embodiment of the present disclosure will be described in more detail with reference to FIGS. 8 to 12.

First Power Conversion Mode: External Device→High Voltage Battery

Figure 8:
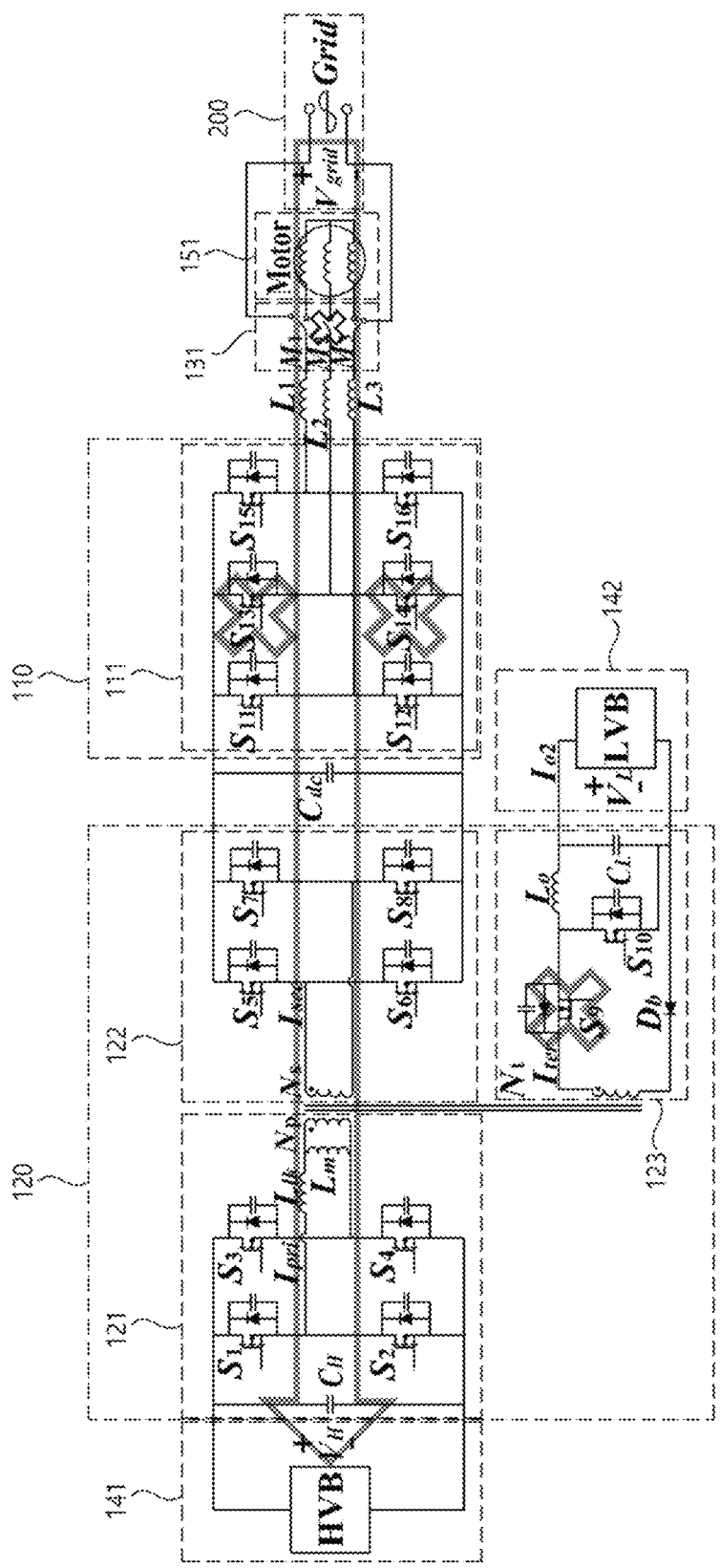
FIG. 8 is a view for explaining an operation according to a first power conversion mode according to an exemplary embodiment of the present disclosure.

FIG. 8 is a view for explaining an operation according to a first power conversion mode according to an exemplary embodiment of the present disclosure.

Referring to FIG. 8, when the power conversion control unit 130 operates in the first power conversion mode, the power conversion control unit 130 controls the first converter unit 110 to be connected to the external device 200. That is, the power conversion control unit 130 controls the second switching module $M_2$ to be open and the first switching module $M_1$ and the third switching module $M_3$ to be connected to the external device 200 to connect the first converter unit 110 to the external device 200.

The power conversion control unit 130 turns off the thirteenth switching element $S_{13}$ and the fourteenth switching element $S_{14}$ of the fourth circuit 111 to control the 3-leg converters (including $S_{11}$, $S_{12}$, $S_{15}$, $S_{16}$) of the fourth circuit 111 to operate as a totem pole PFC converter. The power conversion control unit 130 turns off the ninth switching element $S_9$ of the third circuit 123 to control the step-down converters (including $S_9$, $S_{10}$, $D_b$, $L_0$, and $C_L$) of the third circuit 123 to be separated from the power conversion system (that is, the integrated power conversion apparatus 100 according to the present disclosure). The power conversion control unit 130 controls the H-bridge converters (including $S_5$, $S_6$, $S_7$, and $S_8$) of the second circuit 122 to operate by means of phase shift control and controls the H-bridge converters (including S1, S2, S3, and S4) of the first circuit to operate as a synchronous rectifier. By doing this, the high voltage battery may be charged with the power supplied from the external device 200 based on a turn ratio ($N_s$:$N_p$) of the second winding $N_s$ of the second circuit 122 to the first winding $N_p$ of the first circuit 121.

Second Power Conversion Mode: High Voltage Battery→External Device

Figure 9:
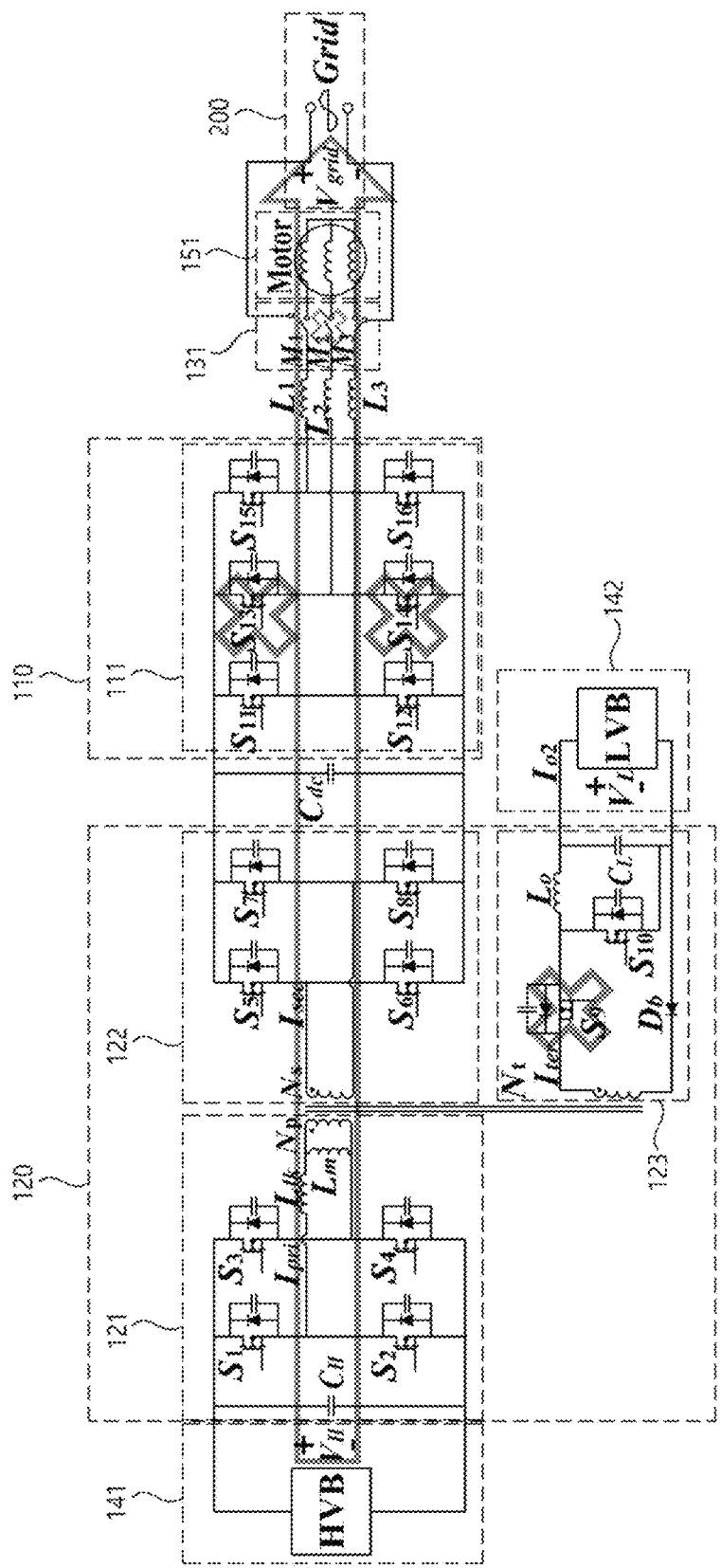
FIG. 9 is a view for explaining an operation according to a second power conversion mode according to an exemplary embodiment of the present disclosure.

FIG. 9 is a view for explaining an operation according to a second power conversion mode according to an exemplary embodiment of the present disclosure.

Referring to FIG. 9, when the power conversion control unit 130 operates in the second power conversion mode, the power conversion control unit 130 controls the first converter unit 110 to be connected to the external device 200.

That is, the power conversion control unit 130 controls the second switching module $M_2$ to be open and the first switching module $M_1$ and the third switching module $M_3$ to be connected to the external device 200 to connect the first converter unit 110 to the external device 200.

The power conversion control unit 130 controls the H-bridge converters (including S1, S2, S3, and S4) of the first circuit to operate by means of the phase shift control and controls the H-bridge converters (including S5, S6, S7, and S8) of the second circuit 122 to operate as a synchronous rectifier, turns off the thirteenth switching element $S_{13}$ and the fourteenth switching element $S_{14}$ of the fourth circuit 111 to control the 3-leg converters (including $S_{11}$, $S_{12}$, $S_{15}$, $S_{16}$) of the fourth circuit 111 to operate as a single phase inverter, and turns off the ninth switching element $S_9$ of the third circuit 123 to control the step-down converters of the third circuit 123 to be separated from the power conversion system (that is, the integrated power conversion apparatus 100 according to the present disclosure). By doing this, a DC-link voltage $V_{dc}$ is adjusted based on a turn ratio ($N_p$:$N_s$) of the first winding $N_p$ of the first circuit 121 to the second winding $N_s$ of the second circuit 122 to supply the power charged in the high voltage battery to the external device 200.

Third Power Conversion Mode: High Voltage Battery→Motor+Low Voltage Battery

Figure 10:
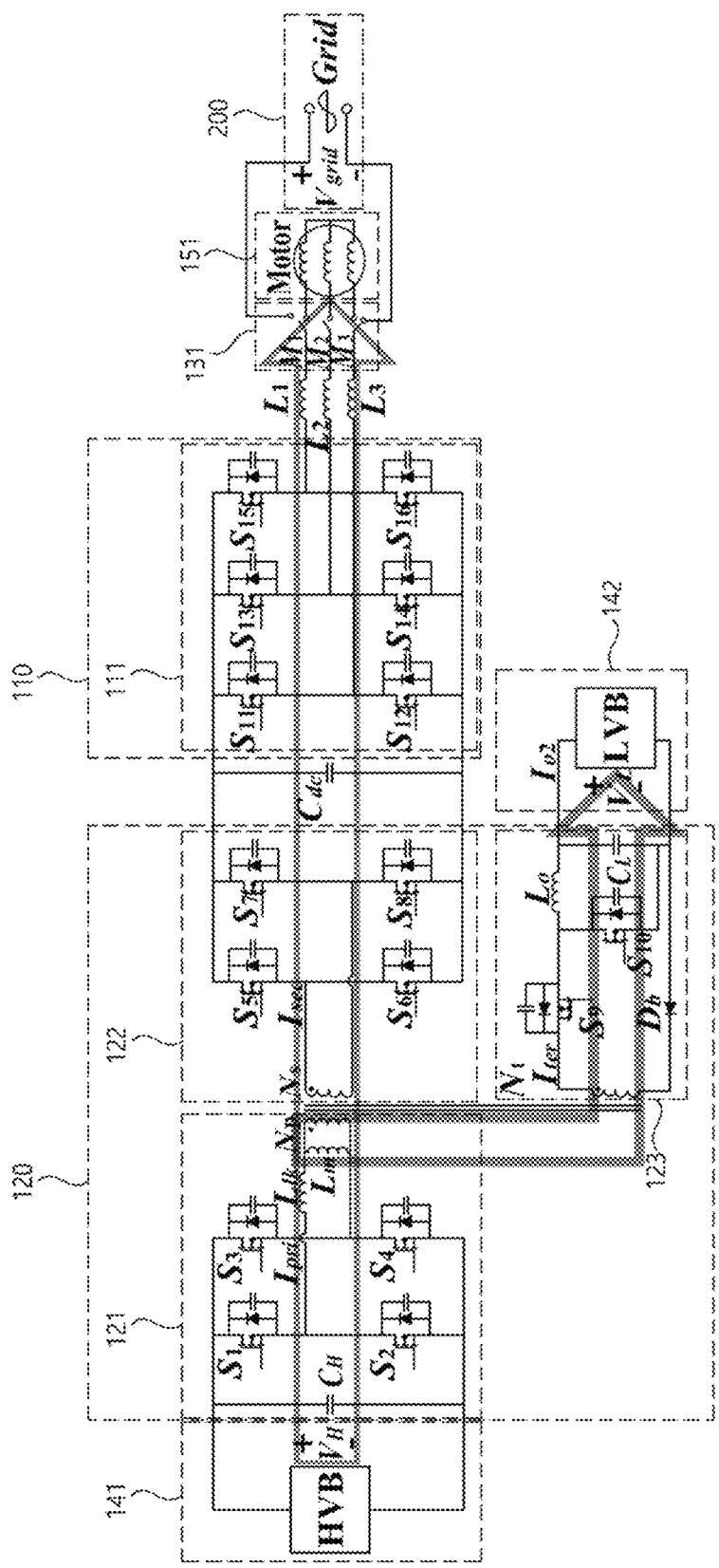
FIG. 10 is a view for explaining an operation according to a third power conversion mode according to an exemplary embodiment of the present disclosure.

FIG. 10 is a view for explaining an operation according to a third power conversion mode according to an exemplary embodiment of the present disclosure.

Referring to FIG. 10, when the power conversion control unit 130 operates in the third power conversion mode, the power conversion control unit 130 controls the first converter unit 110 to be connected to the motor 151. That is, the power conversion control unit 130 controls the second switching module $M_2$ to be connected to the motor 151 and the first switching module $M_1$ and the third switching module $M_3$ to be connected to the module 151 to connect the first converter unit 110 to the motor 151.

The power conversion control unit 130 controls the H-bridge converters (including S1, S2, S3, and S4) of the first circuit to operate by means of the phase shift control to maintain the DC-link voltage required to driver the motor 151 and controls the 3-leg converters (including $S_{11}$, $S_{12}$, $S_{13}$, $S_{14}$, $S_{15}$, and $S_{16}$) of the fourth circuit 111 to operate as a three-phase inverter to drive the motor 151 based on the DC-link voltage to control a PSFB converter (including $S_1$, $S_2$, $S_3$, $S_4$, $S_5$, $S_6$, $S_7$, and $S_8$) configured by the first circuit 121 and the second circuit 122 to adjust the DC-link voltage Vdc which is an input voltage of the three-phase inverter based on the phase shift control and the turn ratio ($N_p$:$N_s$) of the first winding $N_p$ of the first circuit 121 to the winding $N_s$ of the second circuit 122 and raise the voltage of the high voltage battery 141. By doing this, the power charged in the high voltage battery 141 is supplied to the motor 151.

Further, the power conversion control unit 130 controls the step-down converter of the third circuit 123 to adjust a duty and perform a power delivery operation and a freewheeling operation in a period in which the first switching element $S_1$ and the fourth switching element $S_4$ of the first circuit 121 are on and perform a freewheeling operation in the other period to adjust a voltage applied to the first circuit 121 by an operation of the H-bridge converter (including $S_1$, $S_2$, $S_3$, and $S_4$) of the first circuit 121 based on a turn ratio $N_p$:$N_t$ of the first winding $N_p$ of the first circuit 121 to the third winding $N_t$ of the third circuit 123 and the duty of the step-down converter of the third circuit 123. By doing this, the low voltage battery 142 may be charged with the power charged in the high voltage battery 141. At this time, in the period in which the first switching element $S_1$ and the fourth switching element $S_4$ are turned on, the ninth switching element $S_9$ is turned on while adjusting a duty so that the step-down converter delivers the power to the low voltage battery 142 and in the other period, the tenth switching element $S_{10}$ is turned on and the ninth switching element $S_9$ is turned off so that the step-down converter of the third circuit 123 performs the freewheeling operation.

Fourth Power Conversion Mode: External Device→High Voltage Battery+Low Voltage Battery FIG. 11 is a view for explaining an operation according to a fourth power conversion mode according to an exemplary embodiment of the present disclosure.

Figure 11:
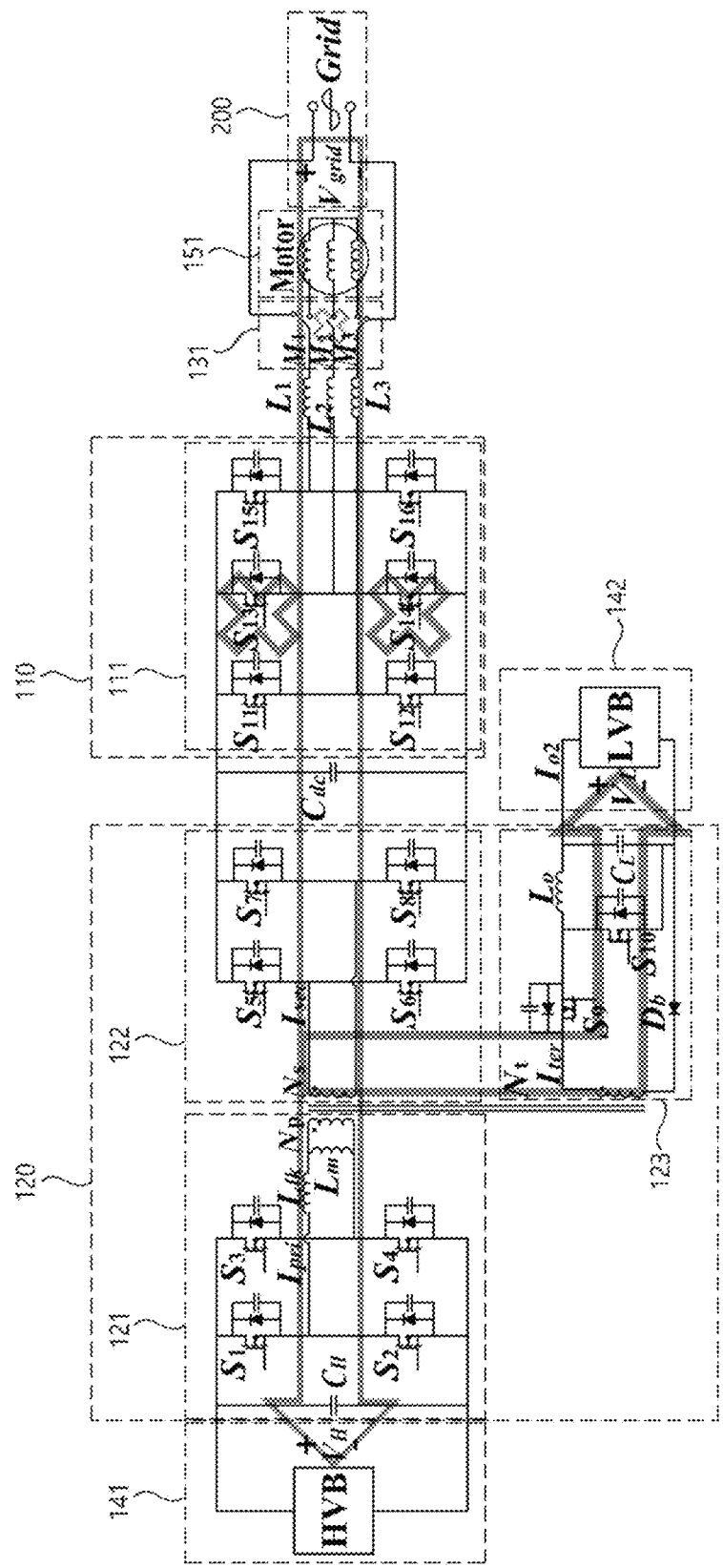
FIG. 11 is a view for explaining an operation according to a fourth power conversion mode according to an exemplary embodiment of the present disclosure.

Referring to FIG. 11, when the power conversion control unit 130 operates in the fourth power conversion mode, the power conversion control unit 130 controls the first converter unit 110 to be connected to the external device 200. That is, the power conversion control unit 130 controls the second switching module $M_2$ to be open and the first switching module $M_1$ and the third switching module $M_3$ to be connected to the external device 200 to connect the first converter unit 110 to the external device 200.

The power conversion control unit 130 turns off the thirteenth switching element $S_{13}$ and the fourteenth switching element $S_{14}$ of the fourth circuit 111 to control the 3 leg converter (including $S_{11}$, $S_{12}$, $S_{15}$, and $S_{16}$) to operate as a totem pole PFC converter and controls the H-bridge converter (including $S_5$, $S_6$, $S_7$, and $S_8$) of the second circuit 122 to operate by the phase shift control, controls the H-bridge converter (including $S_1$, $S_2$, $S_3$, and $S_4$) of the first circuit 121 to operate as a synchronous rectifier to charge the high voltage batter 141 with the power supplied from the external device 200 based on a turn ratio $N_s$:$N_p$ of the second winding $N_s$ of the second circuit 122 to the first winding $N_p$ of the first circuit 121.

Further, the power conversion control unit 130 controls the step-down converter of the third circuit 123 to adjust a duty and perform a power delivery operation and a freewheeling operation in a period in which the fifth switching element $S_5$ and the eighth switching element $S_8$ of the second circuit 122 are on and perform a freewheeling operation in the other period to adjust a voltage applied to the first circuit 121 by an operation of the H-bridge converter (including $S_5$, $S_6$, $S_7$, and $S_8$) of the second circuit 122 based on a turn ratio $N_s$:$N_t$ of the second winding $N_s$ of the first circuit 122 to the third winding $N_t$ of the third circuit 123 and the duty of the step-down converter of the third circuit 123 to charge the low voltage battery 142 with the power supplied from the external device 200. At this time, in the period in which the fifth switching element $S_5$ and the eighth switching element $S_8$ are turned on, the ninth switching element S9 is turned on while adjusting a duty so that the step-down converter of the third circuit 123 delivers the power to the low voltage battery 142 and in the other period, the tenth switching element $S_{10}$ is turned on and the ninth switching element $S_9$ is turned off so that the step-down converter of the third circuit 123 performs the freewheeling operation.

Fifth Power Conversion Mode: External Device→Low Voltage Battery

Figure 12:
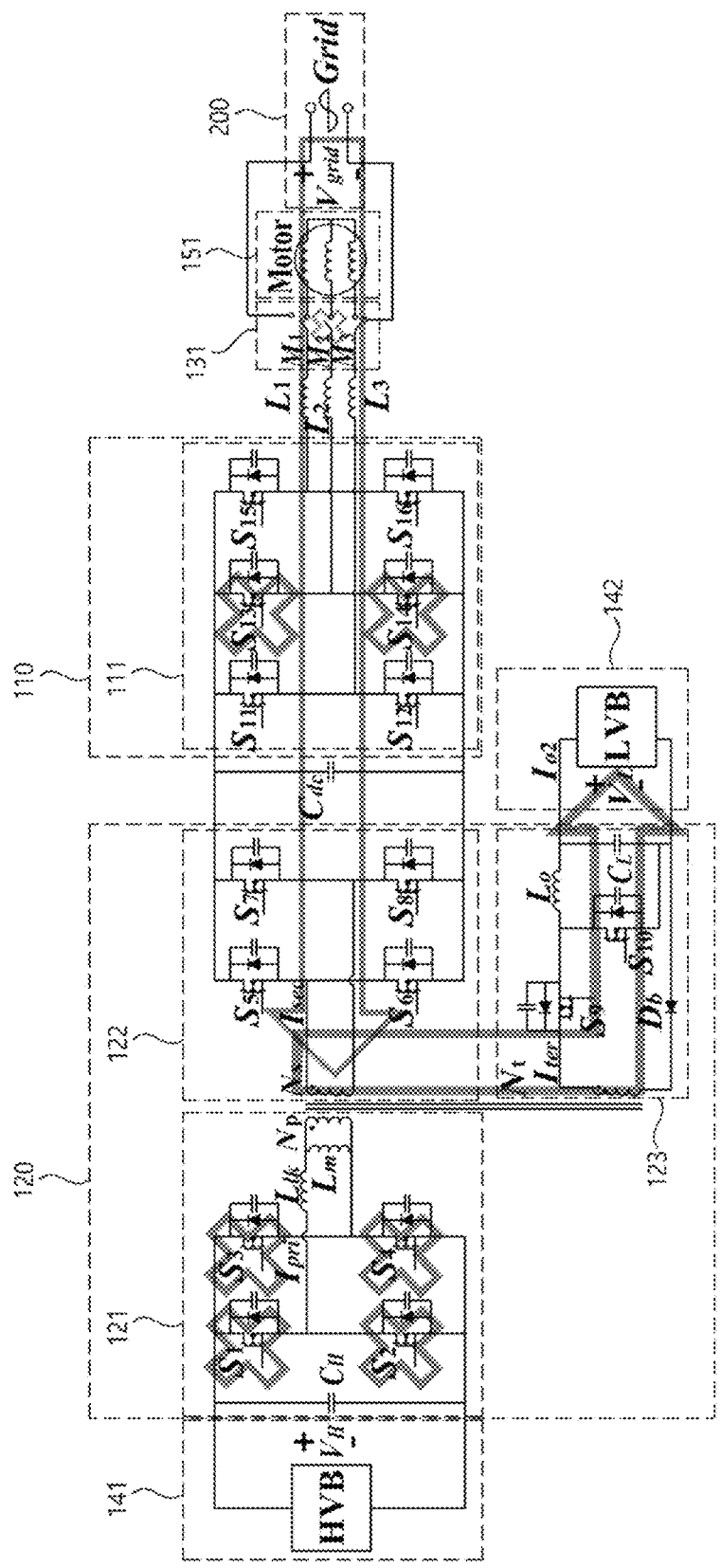
FIG. 12 is a view for explaining an operation according to a fifth power conversion mode according to an exemplary embodiment of the present disclosure.

FIG. 12 is a view for explaining an operation according to a fifth power conversion mode according to an exemplary embodiment of the present disclosure.

Referring to FIG. 12, when the power conversion control unit 130 operates in the fifth power conversion mode, the power conversion control unit 130 controls the first converter unit 110 to be connected to the external device 200. That is, the power conversion control unit 130 controls the second switching module $M_2$ to be open and the first switching module $M_1$ and the third switching module $M_3$ to be connected to the external device 200 to connect the first converter unit 110 to the external device 200.

The power conversion control unit 130 turns off the thirteenth switching element $S_{13}$ and the fourteenth switching element $S_{14}$ of the fourth circuit 111 to control the 3 leg converter (including $S_{11}$, $S_{12}$, $S_{15}$, and $S_{16}$) of the fourth circuit 111 to operate as a totem pole PFC converter and controls the H-bridge converter (including $S_5$, $S_6$, $S_7$, and $S_8$) of the second circuit 122 to operate by the phase shift control having a fixed duty, controls the H-bridge converter (including $S_1$, $S_2$, $S_3$, and $S_4$) of the first circuit 121 to be turned off, and controls the step-down converter of the third circuit 123 to adjust a duty in a period in which the fifth switching element $S_5$ and the eighth switching element $S_8$ of the second circuit 122 are turned on and perform a freewheeling operation in the other period to adjust a voltage applied to the second circuit 122 by the operation of the H-bridge converter of the second circuit based on a turn ratio $N_s:N_t$ of the second winding $N_s$ of the second circuit 122 to the third winding $N_t$ of the third circuit 123 and a duty of the step-down converter of the third circuit 123 to charge the low voltage battery with the power supplied from the external device 200. At this time, in the period in which the fifth switching element $S_5$ and the eighth switching element $S_8$ are turned on, the ninth switching element $S9$ is turned on while adjusting a duty so that the step-down converter of the third circuit 123 delivers the power to the low voltage battery 142 and in the other period, the tenth switching element $S_{10}$ is turned on and the ninth switching element $S_9$ is turned off so that the step-down converter of the third circuit 123 performs the freewheeling operation.

Now, an advantage of the integrated power conversion apparatus for an electric vehicle according to the exemplary embodiment of the present disclosure will be described.

The integrated power conversion apparatus according to the present disclosure operates by means of a topology in which a G2V (grid to vehicle) function (an operation according to the first power conversion mode) and a V2G (vehicle to grid) function (an operation according to the second power conversion mode) are the same.

Further, when the integrated power conversion apparatus 100 according to the present disclosure operates as a LDC/TC function (an operation according to the third power conversion mode) and a hybrid charging function (an operation according to the fourth power conversion mode), in the related art, converts which operate according to the individual loads are provided, but according to the present disclosure, one integrated circuit simultaneously performs two functions.

Figure 3:
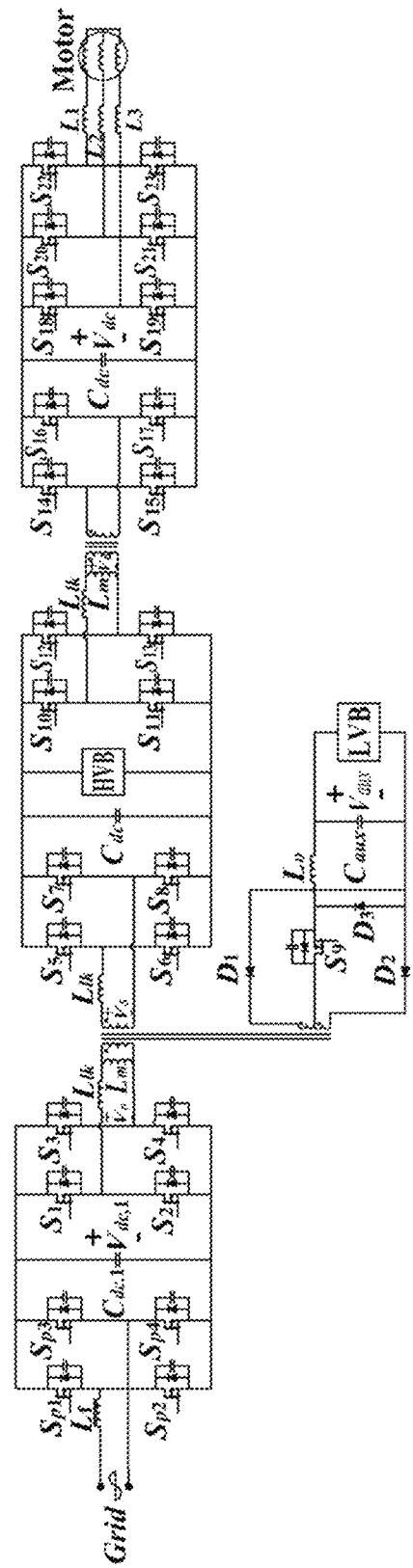
FIG. 3 is a view for explaining a topology of a power conversion system to which an OBC/LDC integrated circuit of the related art is applied.
Figure 4:
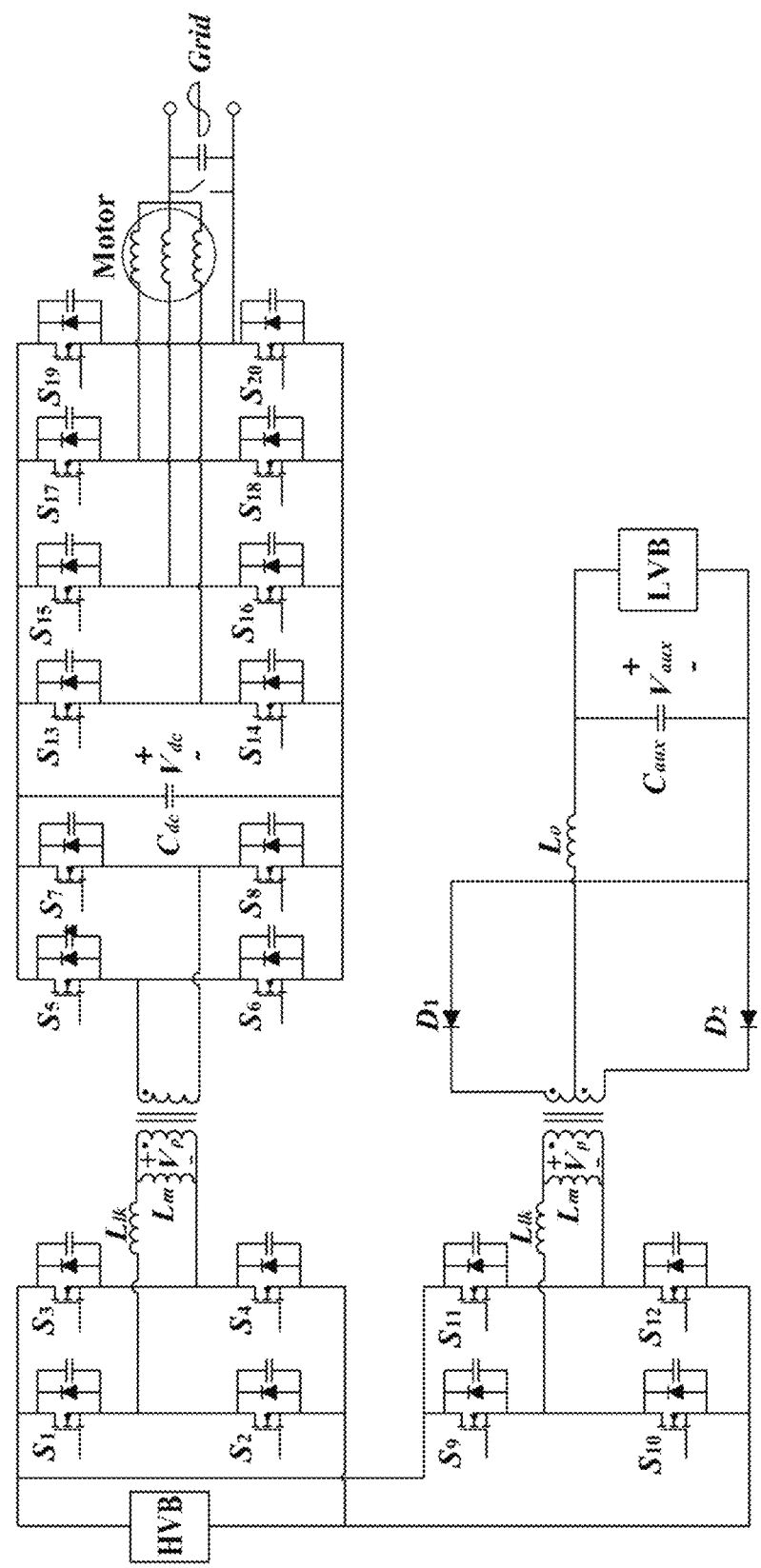
FIG. 4 is a view for explaining a topology of a power conversion system to which an OBC/TC integrated circuit of the related art is applied.

Accordingly, the integrated power conversion apparatus 100 according to the present disclosure performs all the functions which have been performed by the power conversion system of the related art. Further, when the number of switches is compared with a detachable power conversion system (see S2), 47% is reduced. Further, as compared with the power conversion system (see FIG. 3) to which the OBC/LDC integrated circuit of the related art is applied, 45% is reduced. Further, as compared with the power conversion system (see FIG. 4) to which the OBC/LDC integrated circuit of the related art is applied, 22% is reduced so that the power density is increased and the number of switches and the control units is reduced to improve feasibility.

Figure 2:
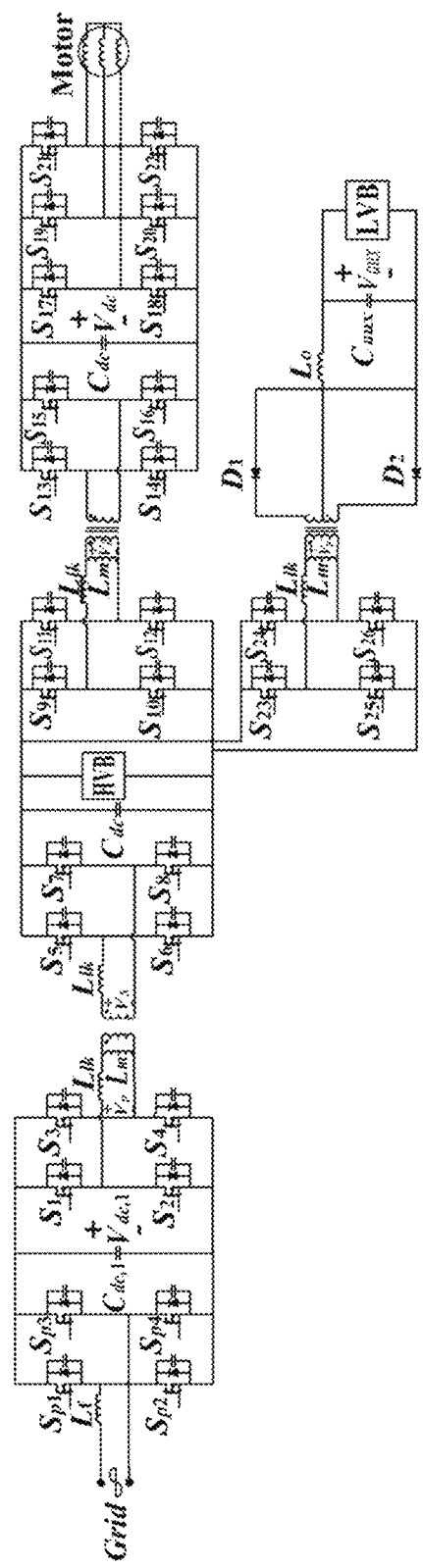
FIG. 2 is a view for explaining a topology of a detachable power conversion system of the related art illustrated in FIG. 1.

Comparison of integrated power conversion system (see FIG. 7) according to present disclosure and detachable power conversion system (see FIG. 2)
 1) A volume of an entire system (a power density is increased) is reduced by reducing the number of switches by 47%.
 2) A number of switches is reduced by 45% to increase the feasibility
 3) A number of controllers is reduced to increase the feasibility.
 4) A hybrid charging function and a low voltage battery charging function can be performed Comparison of integrated power conversion system (see FIG. 7) according to present disclosure and power conversion system applying OBC/LDC integrated circuit (see FIG. 3)
 1) A volume of an system (a power density is increased) is reduced by reducing the number of switches by 43%.
 2) A number of switches is reduced by 43% to increase the feasibility
 3) A number of controllers is reduced to increase the feasibility.
 4) All the functions of the related art can be performed Comparison of integrated power conversion system (see FIG. 7) according to present disclosure and power conversion system applying OBC/TC integrated circuit (see FIG. 4)
 1) A volume of an system (a power density is increased) is reduced by reducing the number of switches by 23%.
 2) A number of switches is reduced by 23% to increase the feasibility
 3) A number of controllers is reduced to increase the feasibility.
 4) A hybrid charging function and a low voltage battery charging function can be performed In summary, the integrated power conversion apparatus 100 according to the present disclosure is configured to operate according to all load conditions through one integrated power conversion system, rather than a structure in which power conversion apparatus corresponding to the individual loads are provided to perform the functions required for the system of the related art using a minimum element without increasing the performance in each function. Accordingly, the size of the entire power conversion system which is mounted in the electric vehicle xEV is reduced and the number of elements is minimized so that it is advantageous in terms of the cost.

That is, under the assumption that the same switch is used, the present disclosure performs the same function with 47% lower price than the detachable power conversion system of the related art, 43% lower price than the power conversion system to which the OBC/LDC integrated circuit is applied, and 23% lower price than the power conversion system to which the OBC/TC integrated circuit is applied.

Further, the detachable power conversion system of the related art and the power conversion system applying the OBC/TC integrated circuit cannot perform a hybrid charging function and the low voltage battery charging function which charge the low voltage battery from a system, but the present disclosure performs this function.

Now, an integrated power conversion apparatus for an electric vehicle according to an exemplary embodiment of the present disclosure will be described with reference to FIG. 13.

Figure 13:
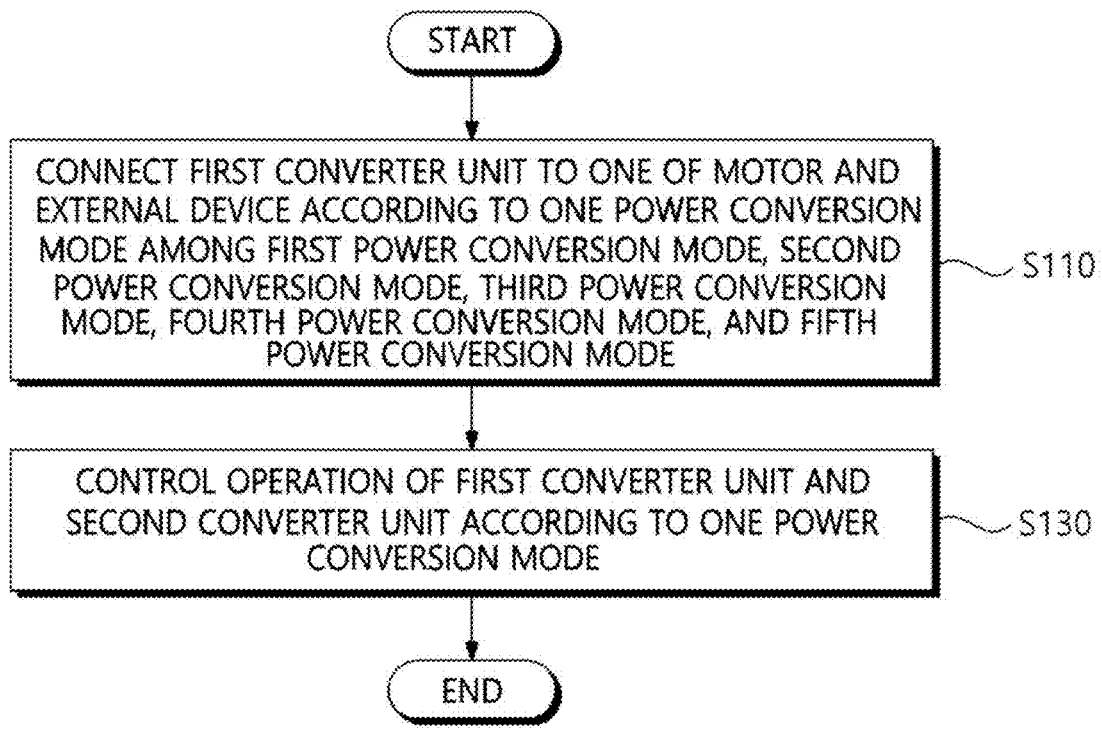
FIG. 13 is a flowchart for explaining an integrated power conversion method of an electric vehicle according to an exemplary embodiment of the present disclosure.

FIG. 13 is a flowchart for explaining an integrated power conversion method of an electric vehicle according to an exemplary embodiment of the present disclosure.

Referring to FIG. 13, the power conversion control unit 130 of the integrated power conversion apparatus 100 connects the first converter unit 110 to one of the motor 151 and the external device 200 according to one power conversion mode among a first power conversion mode, a second power conversion mode, a third power conversion mode, a fourth power conversion mode, and a fifth power conversion mode in step S110.

That is, according to one power conversion mode, the power conversion control unit 130 makes the second switching module $M_2$ open and connects the first switching module $M_1$ and the third switching module $M_3$ to the external device 200 to control the first converter unit 110 to be connected to the external device 200 or connects the second switching module $M_2$ to be connected to the motor 151 and connects the first switching module $M_1$ and the third switching module $M_3$ to the motor 151 to control the first converter unit 110 to be connected to the motor 151.

Next, the power conversion control unit 130 of the integrated power conversion apparatus 100 controls the operation of the first converter unit 110 and the second converter unit 120 according to one power conversion mode in step S130.

That is, the power conversion control unit 130 controls an operation of the first converter unit 110 and the second converter unit 120 to charge the high voltage battery 141 with a power supplied from the external device 200 according to the first power conversion mode, controls an operation of the first converter unit 110 and the second converter unit 120 to supply the power charged in the high voltage battery 141 to the external device 200 according to the second power conversion mode, controls an operation of the first converter unit 110 and the second converter unit 120 to supply the power charged in the high voltage battery 141 to the motor 151 and charge the low voltage battery 142 with the power charged in the high voltage battery 141 according to the third power conversion mode, controls an operation of the first converter unit 110 and the second converter unit 120 to charge the high voltage battery 141 and the low voltage battery 142 with the power supplied from the external device 200 according to the fourth power conversion mode, and controls an operation of the first converter unit 110 and the second converter unit 120 to charge the low voltage battery 142 with the power supplied from the external device 200 according to the fifth power conversion mode.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardware. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit of the present invention is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. An integrated power conversion apparatus for an electric vehicle, comprising:
    a first converter unit which is selectively connected to one of a driving unit including a motor and an external device;
    a second converter unit whose one end is connected to the first converter unit through one end and the other end is connected to a power storage unit including a high voltage battery and a low voltage battery; and
    a power conversion control unit which controls the first converter unit and the second converter unit to operate in one of a first power conversion mode in which the high voltage battery is charged with a power supplied from the external device, a second power conversion mode in which the power charged in the high voltage battery is supplied to the external device, a third power conversion mode in which the power charged in the high voltage battery is supplied to the motor and the low voltage battery is charged with the power charged in the high voltage battery, a fourth power conversion mode in which the high voltage battery and the low voltage battery are charged with the power supplied from the external device, and a fifth power conversion mode in which the lower voltage battery is charged with the power supplied from the external device,
    wherein the second converter unit includes:
    a first circuit which is connected to the high voltage battery through one end and includes a H-bridge converter;
    a second circuit which is connected to the first converter unit through one end and includes a H-bridge converter; and
    a third circuit which is connected to the low voltage battery through one end and includes a step-down converter, and
    the first converter unit includes:
    a fourth circuit which is connected to the second circuit through one end and is connected to one of the motor and the external device through the other end and includes a 3-leg converter.

2. The integrated power conversion apparatus for an electric vehicle according to claim 1, wherein the first circuit includes a H-bridge converter including a first switching element, a second switching element, a third switching element, and a fourth switching element,
    the second circuit includes a H-bridge converter including a fifth switching element, a sixth switching element, a seventh switching element, and an eighth switching element, the third circuit includes a step-down converter including a ninth switching element and a tenth switching element, and the fourth circuit including a 3-leg converter including an eleventh switching element, a twelfth switching element, a thirteenth switching element, a fourteenth switching element, a fifteenth switching element, and a sixteenth switching element.

3. The integrated power conversion apparatus for an electric vehicle according to claim 2, wherein when the power conversion control unit operates in the first power conversion mode, the power conversion control unit controls the first converter unit to be connected to the external device, turns off the thirteenth switching element and the fourteenth switching element of the fourth circuit to control the 3-leg converter of the fourth circuit to operate as a totem pole PFC converter configured by the eleventh switching element, the twelfth switching element, the fifteenth switching element, and the sixteenth switching element, turns off the ninth switching element of the third circuit to control the step-down converter of the third circuit to be separated from the power conversion system and controls the H-bridge converter of the second circuit to operate by phase shift control, and controls the H-bridge converter of the first circuit to operate as a synchronous rectifier to charge the high voltage battery with a power supplied from the external device based on a turn ratio of a second winding of the second circuit to a first winding of the first circuit.

4. The integrated power conversion apparatus for an electric vehicle according to claim 2, wherein when the power conversion control unit operates in the second power conversion mode, the power conversion control unit controls the first converter unit to be connected to the external device, controls the H-bridge converter of the first circuit to operate by phase shift control, and controls the H-bridge converter of the second circuit to operate as a synchronous rectifier, turns off the thirteenth switching element and the fourteenth switching element of the fourth circuit to control the 3-leg converter of the fourth circuit to operate as a single phase inverter configured by the eleventh switching element, the twelfth switching element, the fifteenth switching element, and the sixteenth switching element, turns off the ninth switching element of the third circuit to control the step-down converter of the third circuit to be separated from the power conversion system and controls the H-bridge converter of the second circuit to operate by phase shift control to charge the high voltage battery with a power supplied from the external device based on a turn ratio of a first winding of the first circuit to a second winding of the second circuit.

5. The integrated power conversion apparatus for an electric vehicle according to claim 2, wherein when the power conversion control unit operates in the third power conversion mode, the power conversion control unit controls the first converter unit to be connected to the motor, controls the H-bridge converter of the first circuit to operate by phase shift control to maintain a DC-link voltage required to drive the motor, controls the 3-leg converter of the fourth circuit to operate as a three-phase inverter to drive the motor based on the DC-link voltage to control a PSFB converter configured by the first circuit and the second circuit to adjust a DC-link voltage which is an input voltage of the three-phase inverter and raise the voltage of the high voltage battery based on the phase shift control and the turn ratio of the first winding of the first circuit to the winding of the second circuit to supply the power charged in the high voltage battery to the motor and controls the step-down converter of the third circuit to adjust a duty and perform a power delivery operation and a freewheeling operation in the period in which the first switching element and the fourth switching element of the first circuit are turned on and to perform a freewheeling operation in the other period, to adjust a voltage applied to the first circuit with the turn ratio of the first winding of the first circuit to a third winding of the third circuit to charge the low voltage battery with the power charged in the high voltage battery.

6. The integrated power conversion apparatus for an electric vehicle according to claim 2, wherein when the power conversion control unit operates in the fourth power conversion mode, the power conversion control unit controls the first converter unit to be connected to the external device, turns off the thirteenth switching element and the fourteenth switching element of the fourth circuit to control the 3-leg converter of the fourth circuit to operate as a totem pole PFC converter configured by the eleventh switching element, the twelfth switching element, the fifteenth switching element, and the sixteenth switching element, controls the H-bridge converter of the second circuit to operate by phase shift control, and controls the H-bridge converter of the first circuit to operate as a synchronous rectifier to charge the high voltage battery with a power supplied from the external device based on a turn ratio of a second winding of the second circuit to a first winding of the first circuit and controls the step-down converter of the third circuit to adjust a duty and perform a power delivery operation and a freewheeling operation in the period in which the fifth switching element and the eighth switching element of the second circuit are turned on and to perform a freewheeling operation in the other period, to adjust a voltage applied to the second circuit with the turn ratio of the second winding of the second circuit to a third winding of the third circuit to charge the low voltage battery with the power supplied from the external device.

7. The integrated power conversion apparatus for an electric vehicle according to claim 2, wherein when the power conversion control unit operates in the fifth power conversion mode, the power conversion control unit controls the first converter unit to be connected to the external device, turns off the thirteenth switching element and the fourteenth switching element of the fourth circuit to control the 3-leg converter of the fourth circuit to operate as a totem pole PFC converter configured by the eleventh switching element, the twelfth switching element, the fifteenth switching element, and the sixteenth switching element, controls the H-bridge converter of the second circuit to operate by phase shift control having a fixed duty, and controls the step-down converter of the third circuit to adjust the duty in the period in which the fifth switching element and the eighth switching element of the second circuit are turned on and to perform a freewheeling operation in the other period, to adjust a voltage applied to the second circuit with the turn ratio of the second winding of the second circuit to the third winding of the third circuit to charge the low voltage battery with the power supplied from the external device.

8. The integrated power conversion apparatus for an electric vehicle according to claim 1, wherein the power conversion control unit includes:

a first switching module having one end which is selectively connected to the external device and the motor and the other end which is connected to the first converter unit;

a second switching module having one end which is connected to the motor and the other end which is connected to the first converter unit; and a third switching module having one end which is selectively connected to the external device and the motor and the other end which is connected to the first converter unit;

according to one power conversion mode, the power conversion control unit controls the second switching module to be open and the first switching module and the third switching module to be connected to the external device to connect the first converter unit to the external device or controls the second switching module to be connected to the second switching module and controls the first switching module and the third switching module to be connected to the motor to connect the first converter unit to the motor.

9. An integrated power conversion method for an electric vehicle of an integrated power conversion apparatus which includes a first converter unit which is selectively connected to one of a driving unit including a motor and an external device; a second converter unit whose one end is connected to the first converter unit through one end and the other end is connected to a power storage unit including a high voltage battery and a low voltage battery; and a power conversion control unit which controls the first converter unit and the second converter unit, the integrated power conversion method comprising:

allowing the power conversion control unit to connect the first converter mode to one of the motor and the external device according to one power conversion mode among a first power conversion mode, a second power conversion mode, a third power conversion mode, a fourth power conversion mode, and a fifth power conversion mode; and allowing the power conversion control unit to control operations of the first converter unit and the second converter unit according to the one power conversion mode, the first power conversion mode is a mode in which the high voltage battery is charged with a power supplied from the external device, the second power conversion mode is a mode in which the power charged in the high voltage battery is supplied to the external device, the third power conversion mode is a mode in which the power charged in the high voltage battery is supplied to the motor and the low voltage battery is charged with the power charged in the high voltage battery, the fourth power conversion mode is a mode in which the high voltage battery and the low voltage battery are charged with the power supplied from the external device, and the fifth power conversion mode is a mode in which the lower voltage battery is charged with the power supplied from the external device, wherein the second converter unit includes:

a first circuit which is connected to the high voltage battery through one end and includes a H-bridge converter;

a second circuit which is connected to the first converter unit through one end and includes a H-bridge converter; and a third circuit which is connected to the low voltage battery through one end and includes a step-down converter, and the first converter unit includes:

a fourth circuit which is connected to the second circuit through one end and is connected to one of the motor and the external device through the other end and includes a 3-leg converter.

10. The integrated power conversion method for an electric vehicle according to claim 9, wherein the first circuit includes a H-bridge converter including a first switching element, a second switching element, a third switching element, and a fourth switching element, the second circuit includes a H-bridge converter including a fifth switching element, a sixth switching element, a seventh switching element, and an eighth switching element, the third circuit includes a step-down converter including a ninth switching element and a tenth switching element, and the fourth circuit including a 3-leg converter including an eleventh switching element, a twelfth switching element, a thirteenth switching element, a fourteenth switching element, a fifteenth switching element, and a sixteenth switching element.

11. The integrated power conversion method for an electric vehicle according to claim 9, wherein the power conversion control unit includes:

a first switching module having one end which is selectively connected to the external device and the motor and the other end which is connected to the first converter unit;

a second switching module having one end which is connected to the motor and the other end which is connected to the first converter unit; and a third switching module having one end which is selectively connected to the external device and the motor and the other end which is connected to the first converter unit;

in the first converter unit connecting step, according to one power conversion mode, the power conversion control unit controls the second switching module to be open and the first switching module and the third switching module to be connected to the external device to connect the first converter unit to the external device or controls the second switching module to be connected to the second switching module and controls the first switching module and the third switching module to be connected to the motor to connect the first converter unit to the motor.

\* \* \* \* \*